Dec. 13, 1927.
C. L. COOK
MEASURING DEVICE
Filed July 9, 1923
1,652,889
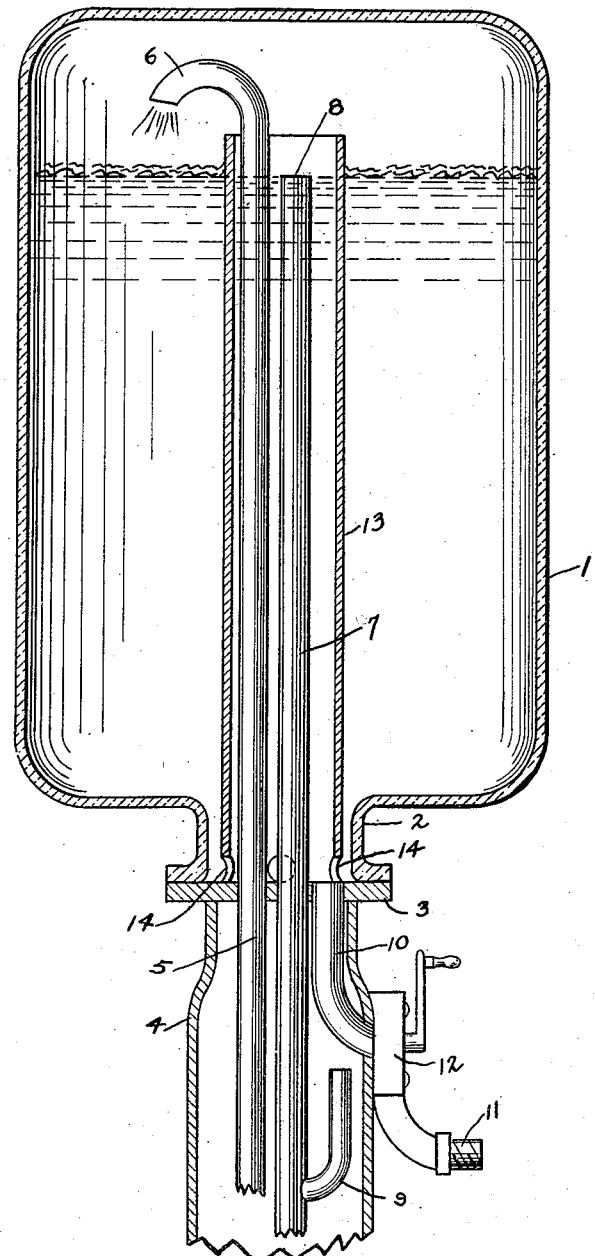
Inventor
Charles Lee Cook,
By
Attorney Patented Dec. 13, 1927.

1,652,889

UNITED STATES PATENT OFFICE.

CHARLES LEE COOK, OF LOUISVILLE, KENTUCKY.

MEASURING DEVICE.

Application filed July 9, 1923. Serial No. 650,497.

The present invention relates to apparatus for measuring gasolene and like fluids, and the object is to provide means whereby the maximum level of a predetermined amount of the fluid in the container is accurately determined as soon as said level is reached.

One embodiment of the invention is illustrated in the accompanying drawings, which is a vertical sectional view through the container showing the novel mechanism.

The container is designated 1 and is made of glass or other transparent material. This container may be of any desired character, but as shown is in the form of an inverted body having a neck portion 2 that rests upon the top 3 of a suitable tubular standard 4.

Extending upwardly through the standard, through the neck 2 and into the top of the interior of the container 1, is a supply pipe 5, having an offset discharge spout 6 that will deliver the fluid to one side of the center. A capacity-determining member is employed in the form of an overflow pipe 7 that also constitutes a vent for the interior of the container 1. This overflow pipe 7 extends vertically through the standard 4, the neck 2 and it has an open upper end 8 within the container. The pipe 7 may be vertically adjustable in a manner well understood, and is provided outside the container with an open ended vent branch 9 that may open within or without the standard. A delivery pipe for the fluid is shown at 10, and has its inlet end at the bottom of the container, said pipe having a suitable nipple 11, to which a hose may be connected and also having a controlling valve 12 therein.

Surrounding the supply pipe 5 and overflow pipe 7 within the container is a baffle 13 in the form of a vertical tube that extends above the top or inlet end of the overflow pipe 7 and terminates short of the offset discharge spout 6 of the supply pipe. This baffle is suitably fixed on the bottom 3 and is preferably provided with ports 14 in its lower end, said ports affording communication between the interior and exterior of the tube within the container.

With this construction, the overflow pipe 7 is suitably positioned so that its upper end will determine the desired capacity of the container. For example when it is in its uppermost position said pipe 7 may determine the level of the liquid of five gallons of gasolene in the container. The supply of gasolene is introduced into the container through the pipe 5 by any well known means and said gasolene will be discharged outside the baffle 13. The ebullition due to this discharge and the currents and surface waves is confined to the portion of the container outside the baffle 13 so that the surface of the fluid within said tube 13 is quiescent. Consequently when the level reaches the top 8 of the overflow pipe 7, the amount of liquid is immediately and accurately determined, any surplus obviously flowing down said pipe and returning to the reservoir. The upturned vent 9 permits entrance of air as the gasolene is discharged from the container and likewise permits the exit of air as the container is filled, and said vent by being upturned prevents any loss of fluid therethrough during the passage of such fluid through the pipe 7.

From the foregoing, it is thought that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

Having thus fully described my invention what I claim as new and desire to secure by Letters Patent, is:—

1. In dispensing apparatus, the combination with a measuring container, of a tubular baffle in the container having its interior in communication with the interior of the container outside the tubular baffle, a supply pipe extending through the baffle and delivering outside the same, an overflow pipe within the baffle and having its inlet end separated from the outlet of the supply pipe by the baffle, and means for withdrawing the liquid from the lower portion of the container.

2. In dispensing apparatus, the combination with a measuring container, of a baffle sleeve extending upwardly within the container and having its interior in communication with the container outside the sleeve, a supply pipe extending upwardly within the sleeve and having a discharge spout delivering into the container outside the sleeve, an overflow pipe having an upper inlet end within the sleeve, and means for withdrawing liquid from the lower portion of the container.

3. In dispensing apparatus, the combination with a container having a closed top, of a baffle sleeve extending upwardly within the container and terminating short of the top thereof, said sleeve having its interior in communication with the container outside the sleeve, a supply pipe extending upwardly within the container and having an offset discharge spout overhanging above the same and delivering outside the sleeve, an overflow pipe vertically adjustable within the sleeve and having its upper receiving end within the same, and means for withdrawing liquid from the lower end of the container and sleeve.

In testimony whereof, I affix my signature.

CHARLES LEE COOK.